(12) United States Patent
Carr (10) Patent No.: US 6,301,617 B1
(45) Date of Patent: Oct. 9, 2001

(54) SELECTION OF RESOURCES UTILIZING VIRTUAL UNIFORM RESOURCE LOCATORS

(75) Inventor: Wayne J. Carr, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,658

(22) Filed: Dec. 29, 1999

Related U.S. Application Data (62) Division of application No. 08/918,247, filed on Aug. 25, 1997, now abandoned.

(51) Int. Cl.[7] .......................... G06F 15/16; G06F 15/173
(52) U.S. Cl. .......................... 709/227; 709/226; 709/219
(58) Field of Search .................................... 709/227, 219, 709/233, 232, 226

(56) References Cited

U.S. PATENT DOCUMENTS

| 5,706,501 | 1/1998 | Horikiri et al. ................ 395/610 |
|---|---|---|
| 5,787,254 | 7/1998 | Maddalozzo, Jr. et al. .... 395/200.58 |
| 5,862,325 | 1/1999 | Read et al. ................ 395/200.31 |
| 5,889,951 * | 3/1999 | Lombardi ............................ 709/219 |
| 6,003,030 * | 12/1999 | Kenner et al. ........................ 707/10 |
| 6,020,885 * | 2/2000 | Honda ................................ 345/332 |
| 6,092,178 * | 7/2000 | Jindal et al. ......................... 712/27 |

OTHER PUBLICATIONS

OCLC newsletter by K. Wayne Smith, Nov. 1995, No. 218, 1995.*

* cited by examiner

*Primary Examiner*—Zarni Maung
(74) *Attorney, Agent, or Firm*—Blakely, Sokoloff, Taylor & Zafman LLP (57) ABSTRACT

An apparatus and method are disclosed for selecting resources utilizing virtual uniform resource locators. In one embodiment, a method includes determining the on-line status of multiple servers specified by a virtual uniform resource locator. The method further includes selecting one of the multiple servers based upon the status of the servers, resolving an actual uniform resource locator for the selected server, and returning the resolved uniform resource locator.

24 Claims, 4 Drawing Sheets

SELECTION OF RESOURCES UTILIZING VIRTUAL UNIFORM RESOURCE LOCATORS

This application is a divisional application of Ser. No. 08/918,247, filed Aug. 25, 1997, abandoned.

BACKGROUND

1. Field of the Invention

The present invention relates to the field of network software, and more particularly to means and methods for locating resources on the network.

2. Art Background

The Internet is rapidly becoming a new medium for distributing electronic information. A component of the Internet is the World Wide Web (WWW). Data on the World Wide Web (WWW) portion of the Internet is organized through the use of Web pages, which are Hyper Text Mark-up Language (HTML) encoded files or documents that define the collection of information in the page. The data for the Web page is typically stored in files. These files are identified using Universal Resource Locators (hereinafter "URL"s). A URL is an address which points to a particular resource on the Web. For example, URLs identify both Web pages and files which form the content of Web pages. These resources are typically located on Web servers, which are computers running Web server software that enables them to be accessed by way of the Internet. Web browsers are software interfaces that run on World Wide Web clients to provide access to Web servers via a simple user interface. A Web browser allows a Web client to request a particular Web resource from a Web server by specifying a URL. Web browsers display Web pages by simply retrieving the HTML files that describe the page. Once a Web page is displayed, Web resources identified by URLs within the page can be accessed.

Conventional URLs specify an exact location (i.e., both machine and directory on the machine) for an item, such as an HTML page or a GIF (Graphical Interchange Format) image. A URL consists of a domain name, which is an address to a server computer, a file name on that server, and a protocol to use for retrieving the item. An exemplary URL might look like http://www.intel.com/products/chips/index.html The tag "http:" describes the protocol used to access the file "chips.htm" on the server at domain "www.intel.com." The term "http" stands for HyperText Transport Protocol (HTTP), which is a communications protocol that allows Web browsers to access Web pages at Web servers (a.k.a sites).

Instead of specifying a file, a URL may specify the name of a program (or the directory containing a program) to execute on the Web server computer. Instead of sending a Web page to the requesting browser, the Web server executes the specified program when the URL is received. Common Gateway Interface (CGI) scripts are an example of this type of program.

The server may be configured so that a special program, known as a filter, is executed before returning an HTML file to a requesting browser. The filter can be used to modify or transform the HTML file before returning it to the browser. It would be desirable to use CGI scripting and filter technology in order to enable URLs to identify files on the Internet in a location-independent manner.

One problem with conventional URLs is that if the files to which the URLs point are moved, deleted, or renamed, all of the HTML files containing URLs identifying that file become obsolete. This is because the HTML files contain links to non-existent or renamed files. It would be desirable if files described by URLs could be moved, deleted, or renamed without causing the HTML files that reference those files to become obsolete. It would also be desirable if, when a first server computer storing a file referenced by a URL is unavailable, a backup version of that file on a second server could be accessed automatically to satisfy references to the file in HTML files. It would be further desirable if any solution to these problems was compatible with existing Web standards.

Another problem with conventional URLs occurs when a Web server is turned off, because the files on that server become inaccessible to other servers on the Web. If the server is off, then the URL specifying that server as the path to a particular file becomes ineffective or obsolete. This is especially a problem in corporate workgroups where employees use their desktop computers as personal Web servers. In this type of environment, workgroup members share information via Web pages and each member of the group contributes some content to the Web page. Accordingly, it would be desirable to obtain the reliable access of a large central server, while maintaining the flexibility provided by personal Web servers. It would also be desirable to achieve the same level of reliability for a home (e.g., non-business) Web server by using an ISP server when the home server is inaccessible.

SUMMARY OF THE INVENTION

The present invention is a means and method resolving a virtual URL into a standard URL by processing information including the current state of server availability, resource availability on those servers, and priorities assigned to those resources. Virtual URLs can be used in a number of ways, not limited to the following. Virtual URLs can appear in URLs sent by a browser to a server to fetch a file or run a program. In such a case, the server uses the virtual URL system to locate the best current location for the resource and either redirects the requesting browser to it by a standard redirection return value or else fetches and returns the resource. Virtual URLs can also appear inside HTML pages as part of the HTML instructions to indicate the content the browser should place in the page. In this case, virtual URL software on the server can filter the file and resolve virtual URLs into standard URLs as the file is returned to the requesting browser. Another use for virtual URLs is in connection with Virtual Server Side Includes. Standard server side includes add segments of HTML pages from other files on the same server. Virtual Server Side Includes allow resolution to the best current location—including another server—for the segment to include.

BRIEF DESCRIPTION OF THE DRAWINGS

The present invention is illustrated by way of example, and not limitation, in the figures. Like references indicate similar elements.

DETAILED DESCRIPTION

The present invention describes a method and an apparatus for supporting virtual URLs (Uniform Resource Locators). In the following description, numerous specific details are set forth such as circuits, flow diagrams, etc., in order to provide a thorough understanding of the present invention. In other instances, well-known structures and techniques have not been shown in detail because to do so may obscure the present invention.

The present invention improves interaction among computer users by enabling a workgroup environment built upon standard Web technologies in which each workgroup is responsible for its own set of files and in which URLs to files are dynamically adjusted to account for changes in location and availability. Moreover, the present invention also simplifies the maintenance of HTML files by eliminating the need to edit the URLs in HTML files each time an item is moved, renamed, or made unavailable by an off-line computer system in the workgroup. Thus, virtual URLs allow the use of location-independent URLs that do not suffer from the disadvantages associated with the location-dependent URLs in the prior art.

It will be appreciated that the specific arrangements and methods described herein are merely illustrative of the principles of the present invention. Numerous modifications in form and detail may be made by those of ordinary skill in the art without departing from the scope of the present invention. For example, the virtual URL (Uniform Resource Locator) may be resolved using server-side filters, CGI (Common Gateway Interface) scripts, or server-side include statements.

In one embodiment of the present invention, a virtual URL includes a reference to a virtual computer workgroup and a virtual file name. The virtual URL does not specify a specific path to a server file like a conventional URL. Instead, the virtual URL specifies a method for finding the path to a particular file. The virtual URL can appear in the HTML instructions that describe the contents of Web page. Alternatively, a virtual URL can serve as the URL a browser requests from a server to fetch a Web page or other resource. When the virtual URL is encountered by the Web server software, a sequence of instructions is executed that transform or "resolve" the virtual URL into a reference to a physical location on the Internet for finding the specified file. In other words, the sequence of instructions will locate the best current source of the file, then replace the virtual URL with an actual URL that describes the actual location of the file. (The desired file could itself be a program, such as a CGI script). The sequences of instructions used to resolve the virtual URL can comprise a CGI script, a filter, or any other sequence of instructions for that purpose.

The virtual URL, from left to right, has the format:
<protocol>://<standard part of URL>/virtserv/servergroupname/virtitem/itemname/virtend/<optional remaining part of URL>

The sequence of instructions (that resolve the virtual URL) searches the virtual URL for the key words virtserv and virtitem (the particular keywords used here are merely exemplary). The virtserv reference in the virtual URL identifies the server work group in which the specified resource is located. Numerous different computers may be included in one server work group. The virtitem reference is used to identify the best current replacement for the requested item in the server work group. More specifically, if these keywords are encountered, the sequence of instructions determines which computers comprising the specified workgroup are on-line, and whether each on-line server can supply the file identified by the virtual item descriptor. Servers that can provide the file are prioritized and the server with the highest priority is chosen to supply the requested file. In other words, when the resolution process is complete, all references up through the virtend reference in the virtual URL are replaced by a standard URL which directly identifies the requested item on a particular workgroup server.

The present invention can be implemented in a corporate workgroup environment. For example, individual workgroup members own particular workgroup files that are part of a Web page; those files are located on each member's personal Web server machine. Backup or redundant locations can also be specified for the workgroup files, for example, a second individual workgroup system or a central server can be specified. The software that resolves the virtual URL performs the following steps: (1) checks if the primary workgroup server for the file is up and available (on-line); (2) if the primary server is not available, checks the other servers that can supply the file to determine if they are on-line; (3) chooses the highest-priority server available within the workgroup for supplying the requested file; and (4) provides the requested file.

Figure 1:
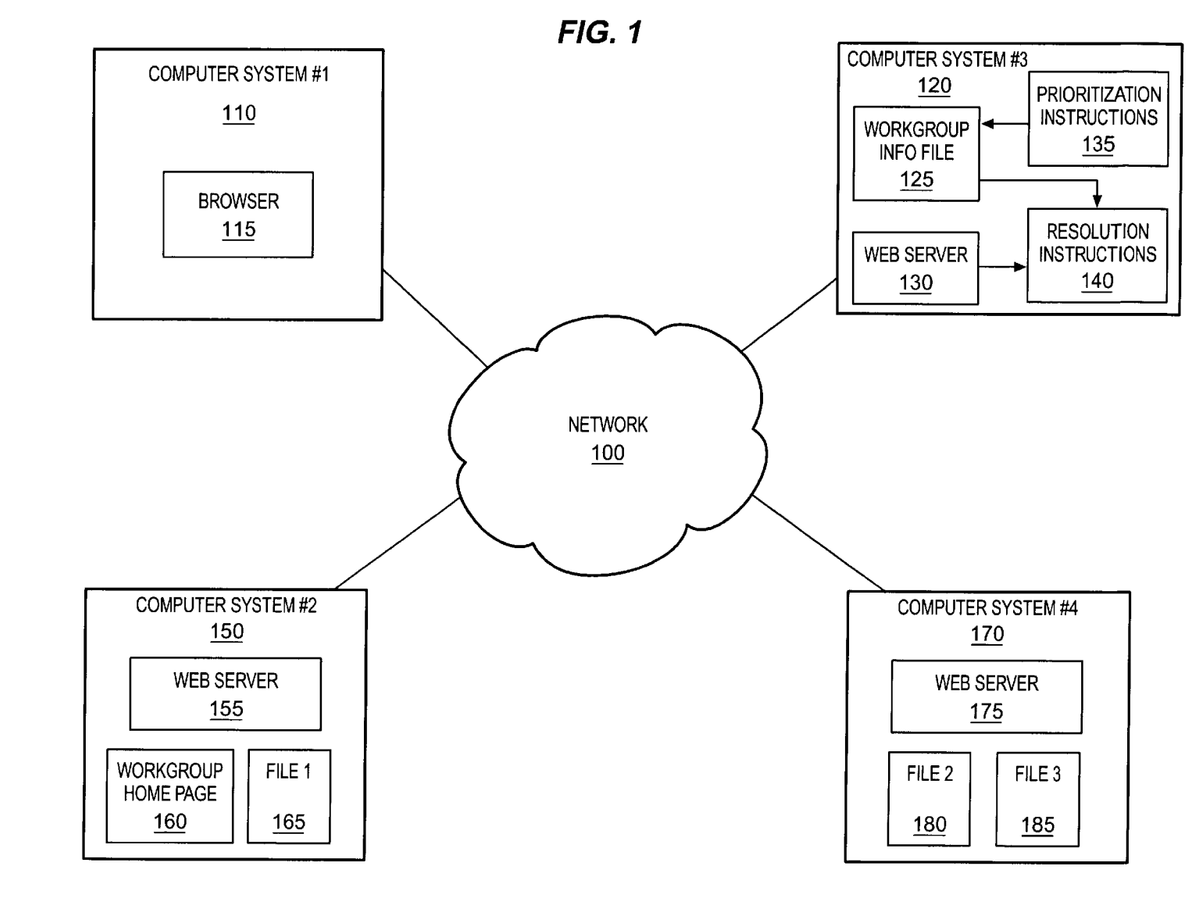
FIG. 1 illustrates the operation of one embodiment of the invention across a plurality of computer systems, each coupled to the others by way of a network.

FIG. 1 illustrates one embodiment of the present invention. A plurality of computer systems are coupled to each other by way of a network 100. The network 100 can represent any type of network for connecting computer systems; for example, a local area network (LAN), a wide area network (WAN), a wireless network, or a network of global proportions such as the Internet Computer system #1 110 comprises a Web browser for retrieving and viewing information from the network 100. Computer system #2 150 comprises a Web server 155, which is part of a computer workgroup, for supplying information in response to a request from the Web browser 115. Computer system #2 150 further comprises a workgroup home page file 160 that describes to the Web browser 115 the information for inclusion in the workgroup home page 160. Computer system #2 150 also further comprises a first workgroup file, FILE1 165 which contains information for inclusion in the workgroup home page 160. Computer system #3 120 comprises a Web server 130 that is coupled to resolution instructions 140, and a workgroup information file 125 that is coupled to both resolution instructions 140 and prioritization instructions 135. Computer system #4 170 comprises a Web server 175, a second workgroup file, FILE2 180, and a third workgroup file, FILE3 185. Both workgroup files 180 and 185 contain information for inclusion in the workgroup home page 160.

One example of how the computer systems #1–#44 (110, 150, 120, 170) inter-operate through the network 100 occurs when an individual connects to the Internet from his or her home computer through an Internet Service Provider (ISP). In FIG. 1, the individual's computer system can be represented by System #2 150, and the ISP's computer system is represented by Computer System #3 120. The individual keeps personal Web page 160 on his personal server 150. The individual may also have a second personal server at the office, represented by Computer System #4 170, with a second Web page represented by FILE2 180.

When a third party (represented by Computer System #1 110) attempts to reach the individual through the Internet network 100, the third party uses a Web browser 115 to send a virtual URL to the ISP system at Computer System #3 120.

The virtual URL contains a virtserv entry identifying the individual's workgroup (which in this case is the combination of his home 150 and office 170, computer Systems #2 and #4, respectively). It also contains a virtitem entry identifying the individual's personal Web page (either the home page or FILE1 160 or the office page or FILE2 180. The Web server 130 on the ISP machine (at Computer System #3 120) invokes the resolution instructions 140 on the virtual URL received from the third party Web browser 115. Using the virtserv reference and the workgroup information file 125 created by the individual, the Web server 130 chooses between System #2 150 and System #4 170 based on priority and availability as described above. It also resolves the virtitem reference and thereby identifies one of the local file names, e.g., either the individual's home page 160, or the Web page on the office machine or FILE2 180.

The workgroup information file 125 contains the information required by the ISP's Computer System #3 120 to resolve the virtual URL into a standard URL that points to one of the individual's personal Web pages. In this example, there are four possible situations that can affect the results of the resolution. First, neither of the individual's computer systems 150 or 170 may be on-line at the time of the request. In this case, the Web server 130 on the ISP computer 120 returns either (1) an error indicating that the individual cannot presently be reached, or (2) an HTML file (generally a very simple one) that acts as a default home page for the individual. Second, the home computer system 150 may be on-line, and the office computer system 170 is off-line. In this case, the virtual URL is resolved to identify the home computer system 150 and the item name is resolved to the file name of the home page 160. Third, the home computer system 150 may be off-line, and the office computer system 170 is on-line. In this case, the virtual URL is resolved to address the office computer system 170 and the item name is resolved to the file name (FELE2) of the office page 180. Finally, both the home computer system 150 and the office computer system 170 could be on-line, in which case the virtual URL is resolved to identify the computer system that has been assigned the highest priority (this could be the home computer system 150 when the individual is at home, and the office computer system 170 when the individual is at the office).

The home page 160 may reference a file (FILE1) 165 which includes content to display in the page. Likewise, the office page 180 may reference a file (FILE3) 185 which includes content to display in the page.

The workgroup information file 125 contains information about which computer systems are to be treated together as a workgroup for the purposes of resolving a virtual URL. The workgroup information file 125 can also contain information about which computer systems are on-line at any given time. This information tends to be quite volatile. The computer systems in a workgroup is relatively stable information; it does not change often. In one embodiment, the ISP computer system 120 periodically queries the individual's computer systems at home 150 and at the office 170 to determine which of the systems are on-line. In another embodiment, each of the individual's computer systems 150 and 170 notify the ISP computer system 120 when its status changes to on-line.

It should be noted that, in one embodiment, the workgroup information file 125 actually comprises two files used to determine the best location of a resource. In this embodiment, a server information file contains information on servers in workgroups and whether they are currently online. A resource information file contains information on what resources each server offers and the priority at which the resource is offered. For simplicity, these two files have been referred to as a single workgroup information file 125 throughout this application.

Figure 2:
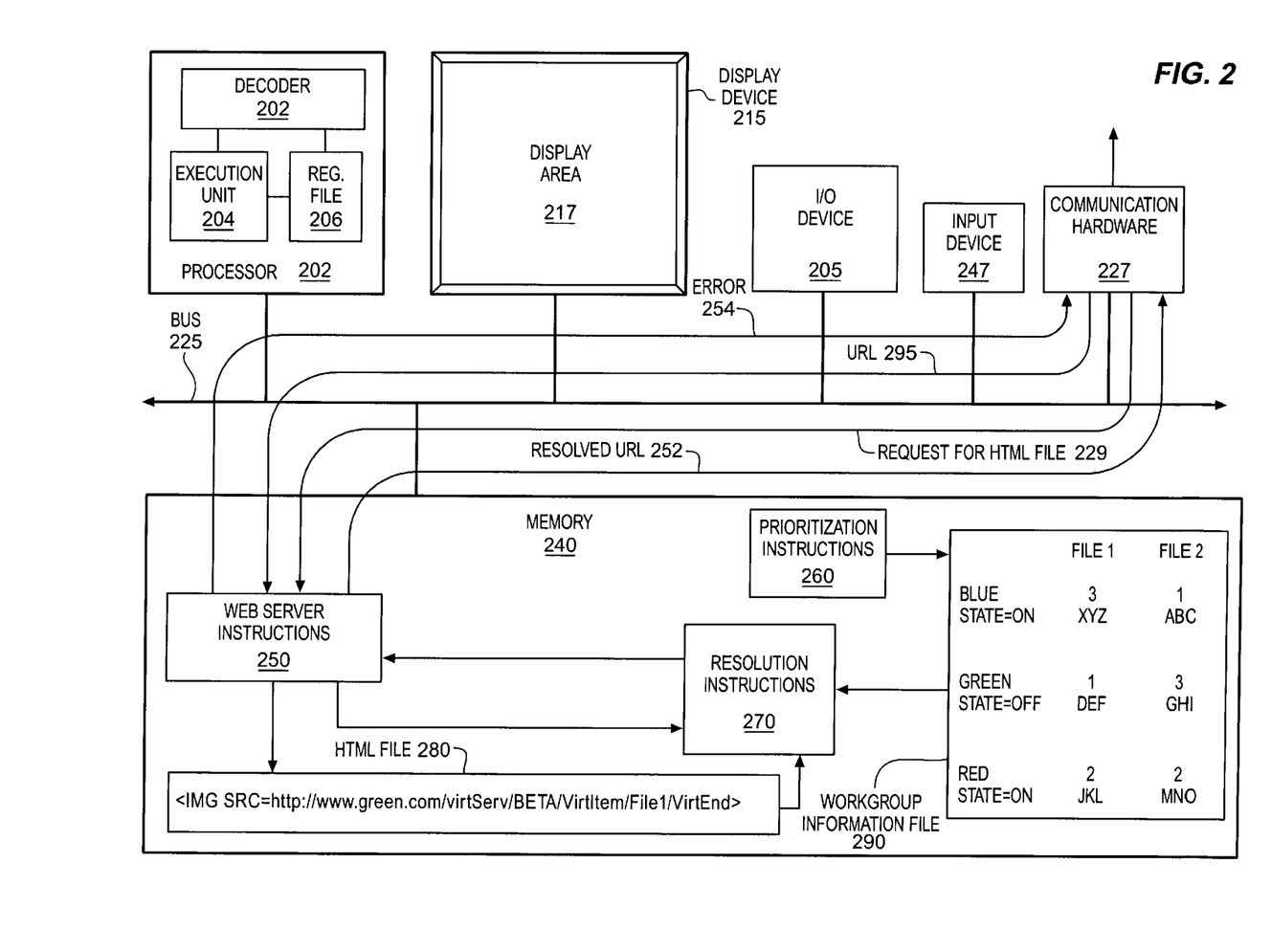
FIG. 2 illustrates a computer system utilizing a memory configured to resolve virtual URLs in 1) browser requests and 2) HTML files.

FIG. 2 illustrates a computer system utilizing a memory configured to resolve virtual URLs located in either (1) browser requests or (2) HTML files. In FIG. 2, a memory 240 stores Web server instructions 250, an HTML file 280, and resolution instructions 270. The memory also stores prioritization instructions 260 and a workgroup information file 290. The memory 240 represents one or more mechanisms for storing data. For example, the memory 240 may include, but is not limited to machine-readable mediums, such as read only memory (ROM), random access memory (RAM), magnetic disk storage mediums, optical storage mediums, flash memory devices and other machine-readable mediums. The memory may also represent a combination of volatile and non-volatile memory.

The memory 240 is coupled to a processor 201 by way of a bus 225. The bus 225 represents one or more busses, such as Peripheral Component Interconnect (PCI) bus, Industry Standard Architecture (ISA) bus, X-Bus, Extended Industry Standard Architecture (EISA) bus, Video Electronics Standard Association (VESA) bus, and optical coupling. This list is meant to be illustrative and not limiting. The processor 201 represents a central processing unit of any type of architecture, such as Complex Instruction Set Computer (CISC), Reduced Instruction Set Computer (RISC), Very Long Instruction Word (VLIW), or a hybrid architecture. In addition, the processor 201 can be implemented on one or more chips.

Using the bus 225, the processor 201 accesses the various elements stored in the memory 240. The processor 201 contains a decoder 202 for decoding instructions, a register file 206 for storing the operands and results of executing the instructions, and an execution unit 204 for executing instructions. Of course, the processor 201 contains additional circuitry which is not necessary to understanding the present invention. The decoder 202 is coupled to the bus 225, and the register file 206 is coupled to the decoder 202. The execution unit 204 is coupled to decoder 202 and the register file 206. In many cases, the operands of instructions decoded by the decoder 202 are made available to the execution unit 204 via the register file 206. The register file 206 contains data registers to store arguments for the received instructions. The register file 206 may contain status registers, control registers, and address registers for controlling the execution of the received instructions. The decoder 202 may be implemented using hard-wired circuitry, a Programmable-Gate-Array (PGA), a microcoded ROM, or by any other applicable method.

A number of user input devices 247, such as a keyboard or a mouse, are also coupled to the bus 225. In addition, a display device 215 having display area 217 is coupled to the bus 225. Communication hardware, such as network 227 may also be coupled to the bus 225. While this embodiment is described in relation to a single processor computer system, the invention can also be implemented in a multi-processor computer system.

The memory 201 contains software sequences implementing one embodiment of the invention for resolving virtual URLs that are sent to the computer system by way of Web browser (URL 295) or which are embedded in the HTML file 280.

In one embodiment, one or more virtual URLs appear in an HTML file 280 that is the subject of an HTML file request 229 from a Web browser on a remote computer system. The request for the HTML file 229 enters the computer system by way of the communication hardware 227, which couples the computer system to an external network, such as the Internet. The request for HTML file 229 reaches the Web server instructions 250 by way of the bus 225 that couples the communication hardware 227 to the memory 240. The Web server instructions 250, when executed on the processor 201, process the request for HTML file 229 by reading the HTML file 280. When a line of the HTML file 280 containing a virtual URL is read by the Web server instructions 250, the Web server invokes the resolution instructions 270 to resolve the virtual URL into a physical location. In one embodiment, the resolution instructions 270 take the form of server-side filter instructions. The resolution instructions input the contents of the workgroup information file 290 in order to carry out the resolution of the virtual URL.

In one embodiment, the workgroup information file 290 contains the following information:

(1) The domain name of each computer system in the workgroup. In this example, there are three computer systems in the workgroup: RED, GREEN, and BLUE.

(2) An on-line status associated with each computer system in the workgroup. In this example, the BLUE machine is on-line, the GREEN machine is off-line, and the RED machine is on-line.

(3) The logical items that are maintained by the workgroup. In this example, the workgroup maintains two logical items: FILE1 and FILE2. Each logical item is associated with a physical file name on one or more computer systems in the workgroup. In this example, the logical item FILE1 is associated with the file XYZ on the BLUE machine, the file DEF on the GREEN machine, and the file JKL on the RED machine. The logical item FILE2 is associated with the file ABC on the BLUE machine, the file GHI on the GREEN machine, and the file MNO on the RED machine.

(4) Each logical item is assigned a priority on each computer system with an associated physical file. In this example, FILE1 has priority 3 on the BLUE machine, priority 1 on the GREEN machine, and priority 2 on the RED machine. FILE2 has priority 1 on the BLUE machine, priority 3 on the GREEN machine, and priority 2 on the RED machine.

The priority value is used to select a computer system to supply the item when there are multiple computer systems on line capable of supplying the item. For example, all three computer systems in this example are capable of supplying the FILE2 item. However, the GREEN system is currently off-line, and so it cannot be a source of the item. Of the two remaining systems, the BLUE system has a higher priority (i.e., priority 1) than the RED system (i.e., priority 2) for the item FILE2, so the BLUE system is selected to supply FILE2 to the requesting computer system.

The resolution instructions 270, when executed on the processor 201, resolve a virtual URL. The virtserv and virtitem references in the URL are used by the resolution instructions 270 to identify both the appropriate server within the server workgroup and the requested item within the server workgroup, respectively. For a virtual URL referencing FILE2, for example, the virtserv reference will be resolved to identify the BLUE system because the BLUE system is given the highest priority for providing FILE2. The virtitem reference will be resolved to identify ABC— the physical file name of FILE2 on the BLUE computer system. The requested item, FILE2, is then returned to the remote browser through communication hardware 227.

It is also possible for the remote browser to send a virtual URL to the computer system. In this situation, the virtual URL is received by the Web server instructions 250 over the bus 225 by way of the communication hardware 227. The Web server instructions 250 invoke the resolution instructions 270 to resolve the virtual URL. In one embodiment, the resolution instructions 270 comprise a CGI script. Resolution occurs in a manner similar to resolution using server-side filters, described above. But in this case, an error indication 254 is returned to the browser, indicating that the URL did not reference an item available on the computer system. Along with the error indication 254, the resolved URL 252 is returned to the browser to provide a redirection indication and a specification of the actual location of the requested item The browser then typically responds by sending the resolved URL to the computer system identified by the URL to request the item.

The priority of each item in the workgroup information file 290 may be dynamically adjusted by the prioritization instructions 260. The prioritization instructions 260, when executed on the processor 201, can adjust the priorities of the various items to factor in considerations such as, for example, network load balancing.

In one embodiment, the resolution instructions 270 and prioritization instructions 260 are located on a trusted server which is always on-line. In this embodiment, virtual URLs in HTML files on other computer systems are resolved by sending those virtual URLs to the trusted server to be resolved and returned. In another embodiment, the resolution instructions 270 and prioritization instructions 260 are duplicated on each computer system in the workgroup, and virtual URLs can be resolved by any computer system in the workgroup.

Other embodiments are possible without departing from the scope of the invention. For example, a central trusted server can be used to resolve virtual URL references to workgroup home pages throughout the enterprise. Browsers send virtual URLs to the trusted server, which returns an error indication along with the resolved URL indicating the physical location of the workgroup home page. The browser then retrieves the workgroup home page using the resolved URL. The workgroup server on which the home page resides resolves virtual URLs in the home page HTML file before returning it to the browser. The workgroup server is responsible for the resolution and prioritization of items owned by the workgroup; the trusted server resolves and prioritizes only the home pages for workgroups throughout the enterprise.

In another embodiment, the domain name of each virtual URL on each workgroup server points to a trusted server. These virtual URLs referencing the trusted server are returned to the browser, which sends the virtual URLs to the trusted server to retrieve the referenced items. The trusted server resolves the virtual URLs, returning an error and the resolved URL. The browser then retrieves the item using the resolved URL. In this embodiment, the trusted server does all of the resolving for all virtual URLs in the enterprise. The trusted server does not itself contain any Web page content, but it knows how to find content on any other server in the enterprise by resolving virtual URLS. The workgroup servers may contain all of the content, but they do not need to contain the resolution and prioritization instructions.

In yet another embodiment, when an item is requested by a browser using a virtual URL, the trusted server resolves the virtual URL, retrieves the item, caches it, and then returns the item (instead of the resolved URL) to the browser. The next time the item is requested, the cached version is returned. Each server in the workgroup that can resolve virtual URLs acts as a proxy server for every other server.

The prioritization of items in the workgroup does not need to be static. Instead, as noted earlier, prioritization can be based upon load-balancing. A server can monitor the traffic load to each server in the workgroup, and when one server becomes extremely busy, the priority of certain items maintained by that server can be dynamically adjusted to make other servers the priority server for those items.

Server-side include statements can also be used within HTML files. Server side include statements are a means of identifying other files which should be incorporated inline with an HTML file. When a server-side include statement is encountered by the Web server software in an HTML file, the file referenced by the statement is incorporated as part of the HTML file. In the prior art, the include statement could only specify a file located on the server machine itself. However, if the included file is specified using a virtual URL, the included file can reside on any other machine on the network.

Figure 3A:
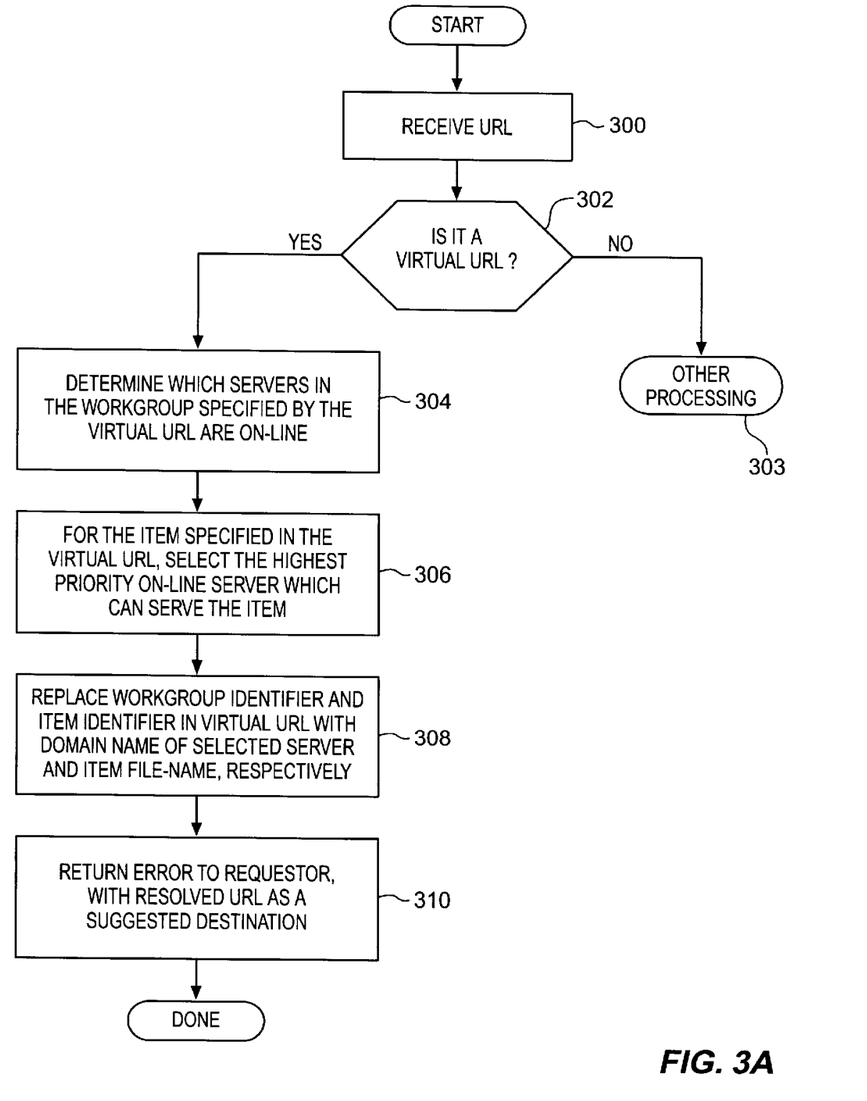
FIG. 3A illustrates a method for resolving a virtual URL received from a Web browser to identify an item on a workgroup server.

FIG. 3A illustrates a method for resolving a virtual URL received from a Web browser into a standard domain name and item. Such a method night typically be accomplished using a CGI script.

At step 300, a URL is received from a remote Web browser. At step 302, a check is made to determine whether or not the received URL is virtual. If the received URL is virtual, then at step 304, a determination is made regarding which servers in the workgroup specified by the virtual URL are on-line. If the received URL is not virtual, then standard URL processing is performed at step 303. However, the file returned through the standard URL processing could contain virtual URLs. This scenario is described below with reference to FIG. 3B.

Following the affirmative (Yes) branch of the method, after determining which workgroup servers are on-line at step 304, the next step is selecting the highest priority online server that can serve the item at step 306. At step 308, the workgroup identifier (e.g., virtserv) identifies the server workgroup, and the item identifier (e.g., virtitem) in the virtual URL identifies the best current selection for the requested item within the server workgroup. After resolving the virtual URL in step 308, the next step is returning an error indication to the requesting browser indicating that the requested item (described in the virtual URL) is not found, but that a suggested location to find the item is identified by the returned, resolved URL.

Figure 3B:
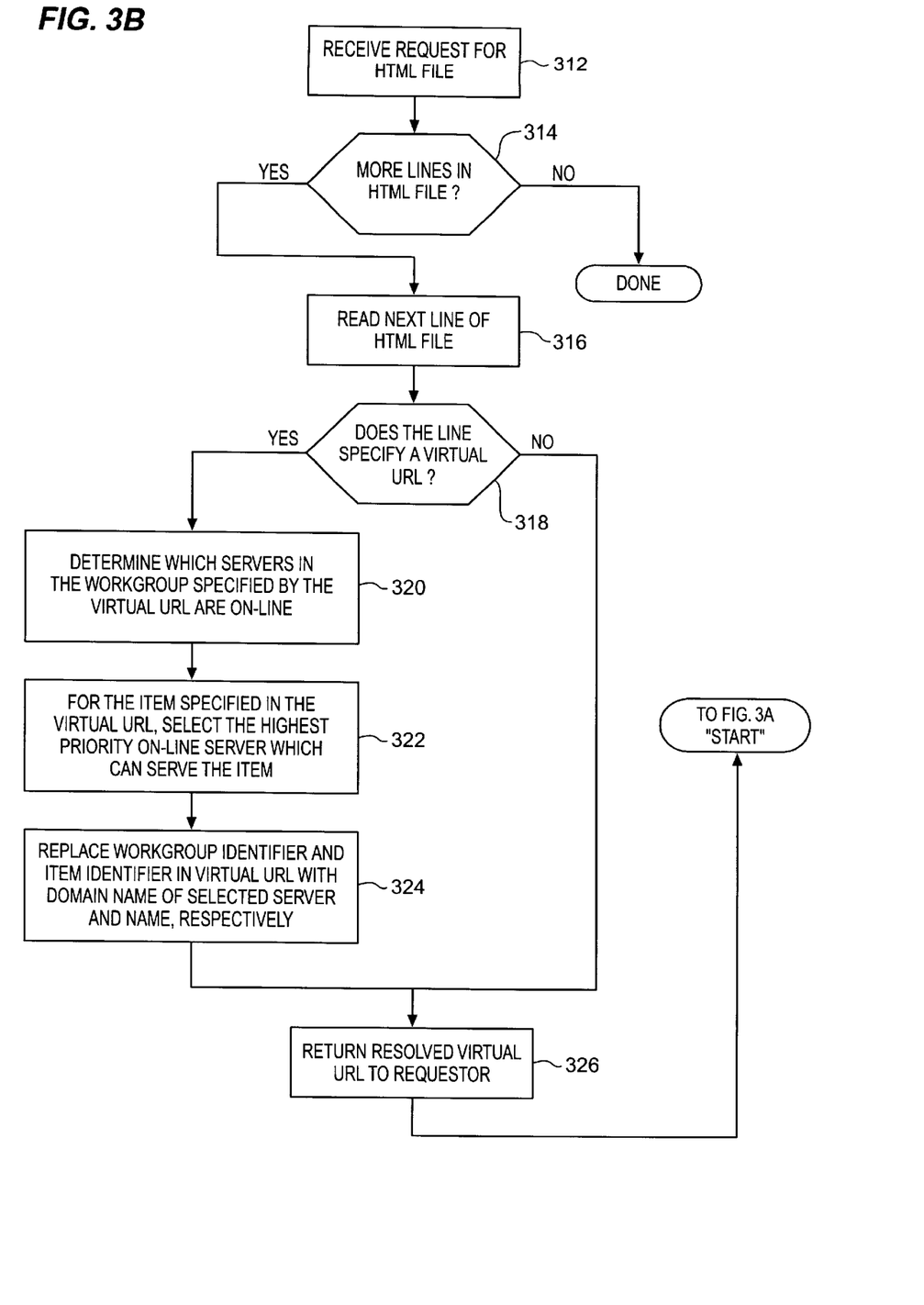
FIG. 3B illustrates a method for resolving references to virtual URLs which are embedded in an HTML file.

FIG. 3B illustrates a method for resolving references to virtual URLs that are embedded in an HTML file. Such a method might typically be accomplished using a server-side filter.

At step 312, a request is received from a browser to return an HTML file. At step 314 a check is made to determine whether or not there are more (or any) lines in the HTML file to read. If there are more lines to read, then the next line of the HTML file is read at step 316. If there are no more lines to read, then the method concludes.

At step 318, a check is made to determine whether or not the line specifies a virtual URL. If the line is a virtual URL, then at step 320 a determination is made as to which servers in the workgroup specified by the virtual URL are on-line. If the line is not a virtual URL, then processing of the method continues at step 326.

Following the affirmative (Yes) branch of the method, after determining which servers of the workgroup are on-line, the next step 322 is to select the highest-priority server in the workgroup which can serve the item specified in the virtual URL. At step 324, the workgroup identifier in the virtual URL identifies a particular workgroup, and the item identifier in the virtual URL identifies the requested item within the selected workgroup. After resolving the virtual URL in step 324, the next step is to return the resolved URL to the browser which requested it at step 326. Processing then continues at step 314 to determine if there are any more lines to read in the HTML file.

Although this invention is shown in relation to a particular embodiment, it should not be considered so limited. The various embodiments described are meant to be illustrative and not limiting. Thus, the invention is defined by the scope of the appended claims.

What is claimed is:

1. A method of resolving a virtual Uniform Resource Locator (URL) reference received from a browser, comprising:

determining an on-line status for each of a plurality of servers specified by a virtual URL;

selecting one of the plurality of servers based on the status of the servers;

resolving an actual URL for the selected server; and returning the resolved URL to the browser.

2. The method of claim 1 further comprising:

extracting the virtual URL from a hypertext markup language (HTML) file.

3. The method of claim 1 wherein the plurality of servers comprises a workgroup, said workgroup specified by the virtual URL.

4. The method of claim 1 wherein selecting one of the plurality of servers is based upon the on-line status of each of the plurality of servers.

5. The method of claim 1 wherein the virtual URL includes an identification of a computer workgroup and a logical item maintained by the computer workgroup.

6. The method of claim 1 wherein the resolved URL identifies a highest priority on-line computer system in the workgroup that can supply said logical item.

7. A method of resolving a virtual Uniform Resource Locator (URL) reference received from a browser, comprising:

determining an on-line status for each of a plurality of servers specified by a logical item, said logical item containing a virtual URL;

selecting one of the plurality of servers based on the status of the servers;

resolving an actual URL for the selected server to identify a plurality of resources specified by the virtual URL; and returning the resolved URL to the browser.

8. The method of claim 7 wherein said resolving an actual URL comprises:

identifying available servers within a workgroup;

locating said plurality of resources specified by said virtual URLs on said available servers; and selecting one of said plurality of resources from one of said available servers.

9. The method of claim 8 wherein said selecting one of said plurality of resources from one of said servers is based on the selected resource having a higher priority on the selected server than on other said servers containing said selected resource.

10. A system for resolving a virtual Uniform Resource Locator (URL) reference received from a browser, comprising:

means for determining an on-line status for each of a plurality of servers specified by the virtual URL;

means for selecting one of the plurality of servers based on the status of the servers;

means for resolving an actual URL for the selected server; and means for returning the resolved URL to the browser.

11. The system of claim 10 further comprising:

means for extracting the virtual URL from a hypertext markup language (HTML) file.

12. A system for resolving a virtual Uniform Resource Locator (URL) reference received from a browser, comprising:

means for determining an on-line status for each of a plurality of servers specified by a logical item, said logical item containing a virtual URL;

means for selecting one of the plurality of servers based on the status of the servers;

means for resolving an actual URL for the selected server to identify a plurality of resources specified by the virtual URL; and means for returning the resolved URL to the browser.

13. An article of manufacture including one or more computer-readable media with executable instructions therein, which, when executed by a processing device, cause the processing device to:

determine an on-line status for each of a plurality of servers specified by the virtual URL;

select one of the plurality of servers based on the status of the servers;

resolve an actual URL for the selected server; and return the resolved URL to the browser.

14. The article of manufacture of claim 13 wherein said computer readable media further include executable instructions that, when executed by the processing device, cause the processing device to:

extract the virtual URL from a hypertext markup language (HTML) file.

15. The article of manufacture of claim 13 wherein the plurality of servers comprises a workgroup, said workgroup specified by the virtual URL.

16. The article of manufacture of claim 13 wherein selecting one of the plurality of servers is based upon the on-line status of each of the plurality of servers.

17. An article of manufacture including one or more computer-readable media with executable instructions therein, which, when executed by a processing device, cause the processing device to:

determine an on-line status for each of a plurality of servers specified by a logical item, said logical item containing a virtual URL;

select one of the plurality of servers based on the status of the servers;

resolve an actual URL for the selected server to identify a plurality of resources specified by the virtual URL; and return the resolved URL to the browser.

18. The article of manufacture of claim 17 wherein to resolve said actual URL comprises:

identifying available servers within a workgroup;

locating said plurality of resources specified by said virtual URLs on said available servers; and selecting one of said plurality of resources.

19. A system for resolving a virtual Uniform Resource Locator (URL) reference received from a browser, comprising:

a web server configured to determine an on-line status for each of a plurality of servers specified by a virtual URL, and to select one of the plurality of servers based on the status of the servers; and a resolving sequence configured to resolve an actual URL for the selected server, and to return the resolved URL to the browser.

20. The system of claim 19 wherein said resolving sequence is further configured to extract the virtual URL from a hypertext markup language (HTML) file.

21. The system of claim 19 wherein the plurality of servers comprises a workgroup, said workgroup specified by the virtual URL.

22. The system of claim 19 wherein the web server is further configured to select one of the plurality of servers based upon the on-line status of each of the plurality of servers.

23. The system of claim 19 wherein the virtual URL includes an identification of a computer workgroup and a logical item maintained by the computer workgroup.

24. The system of claim 19 wherein the resolved URL identifies a highest priority on-line computer system in the workgroup that can supply said logical item.

* * * * *

UNITED STATES PATENT AND TRADEMARK OFFICE
CERTIFICATE OF CORRECTION

PATENT NO. : 6,301,617 B1
DATED : October 9, 2001
INVENTOR(S) : Carr

It is certified that error appears in the above-identified patent and that said Letters Patent is hereby corrected as shown below:

Column 9,
Line 21, delete "night" and insert -- might --.

Column 10,
Line 35, delete "claim 1" and insert -- claim 5 --.

Signed and Sealed this

Twenty-eighth Day of May, 2002

Attest:

JAMES E. ROGAN
Attesting Officer  Director of the United States Patent and Trademark Office